US007384197B2

(12) United States Patent
Plona

(10) Patent No.: US 7,384,197 B2
(45) Date of Patent: Jun. 10, 2008

(54) BEARING ASSEMBLY COMPRISING DOUBLE INJECTION OF LIQUID LUBRICANT, AND AERONAUTICAL VEHICLE COMPRISING AT LEAST ONE SUCH ASSEMBLY

(75) Inventor: Daniel Georges Plona, Vulaines sur Seine (FR)

(73) Assignee: Snecma, Paris (FR)

( * ) Notice: Subject to any disclaimer, the term of this patent is extended or adjusted under 35 U.S.C. 154(b) by 304 days.

(21) Appl. No.: 11/328,267

(22) Filed: Jan. 10, 2006

(65) Prior Publication Data

US 2006/0159378 A1 Jul. 20, 2006

(30) Foreign Application Priority Data

Jan. 17, 2005 (FR) .................................. 05 50129

(51) Int. Cl.
*F16C 33/66* (2006.01)

(52) U.S. Cl. ...................... 384/473; 384/462; 184/11.2

(58) Field of Classification Search ................ 384/462, 384/465, 466, 468, 471, 473–475; 184/11.1, 184/11.2, 7.4

See application file for complete search history.

(56) References Cited

U.S. PATENT DOCUMENTS

| | | | |
|---|---|---|---|
| 4,479,682 | A | 10/1984 | Olivier |
| 5,749,660 | A | 5/1998 | Dusserre-Telmon et al. |
| 2004/0022463 | A1 | 2/2004 | Dusserre-Telmon et al. |

FOREIGN PATENT DOCUMENTS

| | | |
|---|---|---|
| FR | 2 475 656 | 8/1981 |
| FR | 2 740 187 | 4/1997 |
| FR | 2 841 305 | 12/2003 |

*Primary Examiner*—Thomas R Hannon
(74) *Attorney, Agent, or Firm*—Oblon, Spivak, McClelland, Maier & Neustadt, P.C.

(57) ABSTRACT

A bearing assembly includes a first liquid lubricant injector designed to be fed exclusively with non-recycled liquid lubricant to lubricate a bearing. A plurality of drain orifices passes through a bearing ring fixed to a fixed part, and the assembly also includes a second liquid lubricant injector fed with liquid lubricant drained through a collection device for collecting liquid lubricant drained from the orifices, the collection device communicating firstly with a reinjection circuit connected to the second injector, and with a bypass circuit designed to evacuate surplus drained liquid lubricant.

14 Claims, 4 Drawing Sheets

BEARING ASSEMBLY COMPRISING DOUBLE INJECTION OF LIQUID LUBRICANT, AND AERONAUTICAL VEHICLE COMPRISING AT LEAST ONE SUCH ASSEMBLY

TECHNICAL DOMAIN

This invention relates generally to a bearing assembly comprising a fixed part, a rotating part and a bearing inserted between these fixed and rotating parts, the assembly also comprising a first liquid lubricant injector fed exclusively by a non-recycled liquid lubricant source, such as a missile fuel tank.

The invention also relates to any aeronautical vehicle equipped with a turbo-shaft engine for its propulsion, including at least one such bearing assembly.

STATE OF PRIOR ART

Each turbo-shaft engine on aeronautical vehicles such as a missile equipped with one or several turbo-shaft engines integrates at least one bearing assembly globally comprising a rotor shaft, a stator, and a bearing inserted between the rotor shaft and the stator.

In this very widespread type of assembly, the liquid lubricant is transported inside the bearing so as to wet the functional surfaces of the bearing, and therefore to renew the liquid film and to collect heat generated when the rotor shaft forming the rotating part of the assembly is put in rotation.

In a known manner, conventional lubrication of bearings of the periodic injection with grease type in these aeronautical vehicles is insufficient, due to the high performances required in this field, such as the high rotor shaft rotation speed.

Thus, the lubrication technique used to satisfy the above-mentioned requirements must be capable of providing sufficient liquid lubricant at the bearing such that the thickness of the separating film located between the functional surfaces does not degrade, such that the working temperature of this bearing does not rise excessively. In this respect, it should be noted that when lubrication is insufficient, the two phenomena mentioned above mutually exacerbate each other and possibly lead to degradation of a bearing that has reached a critical temperature.

Various solutions have been proposed to avoid the occurrence of such consequences, such as providing dynamic lubrication in which the lubricant liquid is put into continuous circulation in a closed circuit and ejected between bearing rings before leaving again and dissipating heat generated in the bearing.

Although this solution according to prior art is satisfactory in terms of bearing lubrication in that it can be used to obtain a separating film that will not degrade, it does have a non-negligible disadvantage.

This permanent feed technique requires the use of a large and complex closed circuit including recovery scoops, pipes, filters and a pump, which increases the global mass and the cost of the turbo-shaft engine comprising such a bearing assembly with dynamic lubrication.

This closed circuit dynamic lubrication solution can be replaced by a so-called<<lost lubrication>> technique in which the injector splashing lubrication liquid between the bearing rings is fed with liquid lubricant exclusively by a recycled source, therefore implying that this liquid passing through the injector is not reinjected into the feed circuit after being extracted from the bearing, unlike the previously described solution.

The advantage obtained with such a configuration is due to the fact that the required feed circuit does not operate in closed loop, which means that it is much less restrictive in terms of cost, size and weight. It should be noted that this specific feature is particularly advantageous in the context of using a bearing assembly in an aeronautical vehicle such as a missile or a launch system, for which weight reduction is a permanent concern.

Nevertheless, liquid lubricant is usually drawn off from the fuel tank on the vehicle concerned, that therefore forms the source of the non-recycled liquid lubricant. This means that the need to set up abundant and satisfactory lubrication can possibly lead to drawing off a sufficient quantity of non-recycled fuel lubricant thus significantly reducing the endurance/range of the vehicle.

Consequently, a reduction in the fuel lubricant flow drawn off at the tank is desirable, but this can quickly result in a degradation of the thickness of the separating film between the functional surfaces of the bearing, and thus cause degradation to the bearing.

OBJECT OF THE INVENTION

Therefore, the purpose of the invention is to disclose a bearing assembly comprising a fixed part, a rotating part and a bearing inserted between these fixed and rotating parts, and also comprising a bearing lubrication system at least partially overcoming the disadvantages mentioned above with regard to lubrication systems encountered in prior art.

Another purpose of the invention is to disclose an aeronautical vehicle on which a turbo-shaft engine is installed for its propulsion, comprising at least one such bearing assembly.

Therefore, to achieve this, the object of the invention is a bearing assembly comprising a fixed part, a rotating part and a bearing inserted between the fixed and rotating parts, the bearing comprising an inner ring and an outer ring each provided with a circulation track in contact with rolling elements of the bearing, one ring being fixed to the fixed part and the other ring to the rotating part, this assembly also comprising a first liquid lubricant injector designed to be fed exclusively with non-recycled liquid lubricant. According to the invention, a plurality of drain orifices passes through the ring fixed to the fixed part, and the assembly also comprises a second liquid lubricant injector automatically fed with liquid lubricant drained through collection means for collecting liquid lubricant drained from the drain orifices, these collection means communicating firstly with a reinjection circuit connected to the second injector, and with a bypass circuit designed to evacuate surplus drained liquid lubricant.

Therefore it should be understood that the invention discloses a bearing assembly integrating means of making a double injection of liquid lubricant. The first injector makes a first injection of non-recycled liquid lubricant into the bearing, in other words lubricates using liquid that only passes through the bearing once, and that originates from a source that can therefore be qualified as non-renewed during operation or non-recycled, forming part of an unclosed circuit like that described in prior art for the lost lubrication solution.

Simultaneously, the second injector can generate a second automatic injection of liquid lubricant in the bearing, in other words lubricate with liquid drawn off inside the bearing, without it being necessary to provide large and expensive means such as a pump or filters, like those described in prior art for the closed circuit lubrication solution. This second automatic injection is based on the use of kinetic energy created by the rotation of elements in the bearing assembly, which enables ejection of at least some of the liquid located inside the bearing through the drain orifices passing through the ring fixed to the fixed part, and which is sufficient to transfer this liquid part as far as the second injector that can then distribute it again towards the bearing.

Thus, in the bearing assembly according to the invention, the liquid lubricant forced to move by the kinetic energy resulting from rotation then penetrates into the collection means as it leaves the drain orifices, then automatically joins up with the reinjection circuit before finally being reintroduced into the second injector, without the need for the presence of a pump in this second liquid lubricant path. For information, it should be noted that the concept of <<automatic>> feed used above reflects the fact that the only source of energy necessary to draw off liquid inside the bearing and to distribute it from the second injector is the kinetic energy input by rotation of elements of the assembly.

It should be noted that one of the special features of this invention is due to the fact that the drained liquid lubricant output from the drain orifices communicates firstly with the reinjection circuit, and secondly with the bypass circuit used for evacuation of the surplus drained liquid lubricant. In this way, the drained liquid lubricant flow output from the second injector is limited firstly by the outlet cross-section of this second injector, and secondly by the presence of this bypass circuit that enables the drained surplus liquid that cannot be injected by the same injector with a calibrated section to be automatically extracted from the bearing assembly, always preferentially and using the above-mentioned kinetic energy without needing to use pumping means.

This advantageously avoids situations in which the bearing assembly is fed at high pressure; in which the total added quantity of liquid lubricant would be too high and completely incompatible with operation at high speed.

Consequently, the assembly according to the invention has definite advantages in terms of cost, weight and size, and in particular makes it possible to benefit from a greater global flow of liquid lubricant than occurs in the case of prior lost lubrication for the same flow drawn off at the non-recycled source, or have exactly the same global liquid flow as that encountered in the framework of lost lubrication, for a lower flow drawn off at this non-recycled source.

Naturally, it should be noted that this latter advantage is particularly interesting when the assembly according to the invention is applied to an aeronautical vehicle such as a missile or any launch system, for example capable of launching a drone or similar vehicle, to the extent that the endurance/range of this vehicle can then be increased due to the reduction in fuel lubricant drawn off.

Preferably, the drained liquid lubricant collection means consist of at least an annular space formed in the fixed part, and into which the drain orifices open up. Thus, each annular space could be composed of a groove.

Preferably, the drained liquid lubricant collection means consist of a plurality of grooves at an axial spacing from each other and each cooperating with a circumferential group of drain orifices.

Furthermore, the reinjection circuit comprises a duct formed in the fixed part and communicating firstly with the drained liquid lubricant collection means, and secondly with the second injector so as to feed this second injector.

Furthermore, the bypass circuit may include a duct formed in the fixed part and communicating with the drained liquid lubricant collection means. In this case, it would be preferable for the bypass circuit duct to be located in line with the duct of the reinjection circuit, for ease of manufacturing reasons.

Preferably, the fixed part is fixed to the outer ring, and the rotating part is fixed to the inner ring. Naturally, the inverse solution would also be possible without going outside the scope of the invention.

Moreover, the first and second injectors are fixed to the fixed part, and oriented so as to eject liquid lubricant between the two rings at the location of the bearing elements that may indifferently be balls or rollers.

Furthermore, the invention is related to an aeronautical vehicle fitted with a turbo-shaft engine for its propulsion and comprising at least one such bearing assembly, the rotating part being composed of a rotor shaft of the turbo-shaft engine, and the first injector being fed exclusively with liquid lubricant from a fuel tank on this vehicle. Thus, it can be understood that one preferred application of the invention is propelled aeronautical vehicles for which the bearings are at least partially lubricated by liquid lubricant fuel from the fuel tank on this vehicle.

In this respect, the propelled aeronautical vehicle mentioned above may be a missile or a launch system, for example capable of launching a drone.

Other advantages and characteristics of the invention will become clear in the detailed non-limitative description given below.

BRIEF DESCRIPTION OF THE DRAWINGS

This description will be made with reference to the appended drawings among which.

DETAILED DESCRIPTION OF PREFERRED EMBODIMENTS

Figure 1:
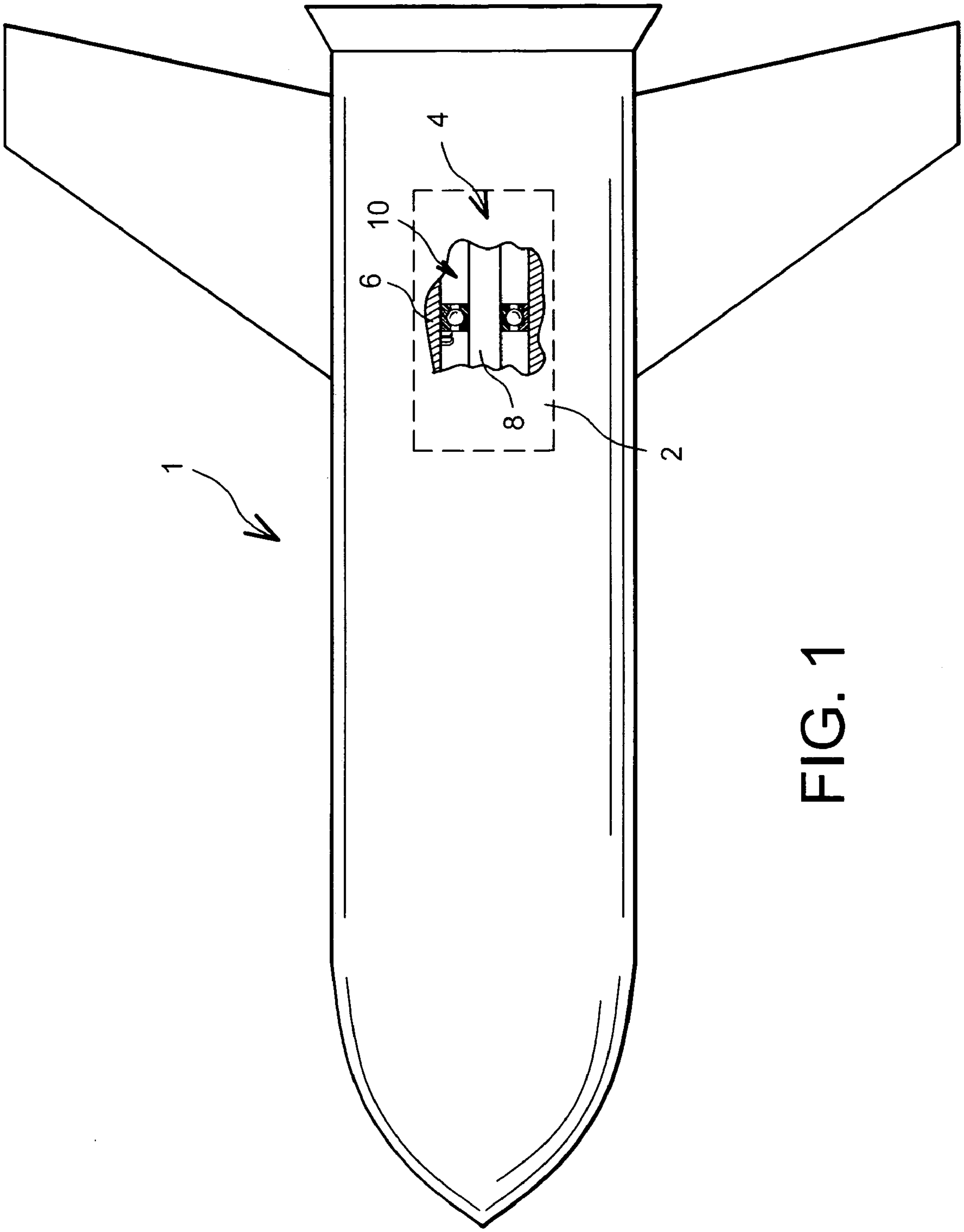
FIG. 1 shows a side view of a missile including a bearing assembly according to a first preferred embodiment of this invention.

With reference firstly to FIG. 1, the figure shows a missile 1 equipped with a turbo-shaft engine 2 for its propulsion, this turbo-shaft engine 2 for example being a turbojet.

This missile 4, another object of this invention, integrates a bearing assembly 4 according to a first preferred embodiment of this invention, this assembly 4 globally comprising a case 6 of the turbo-shaft engine 2, and a rotor shaft 8 coupled to the case 6 through a lubricated bearing 10, the elements 6 and 8 being called the fixed and rotating parts respectively in the remainder of this description.

It should be noted that although the preferred application described in this disclosure relates to a missile, it should obviously be understood that the bearing assembly 4 according to the invention can be applied to all aeronautical or non-aeronautical vehicles for which the bearing concerned will be lubricated at least partly by a source of non-recycled liquid lubricant such as the fuel tank on this missile.

Figure 2:
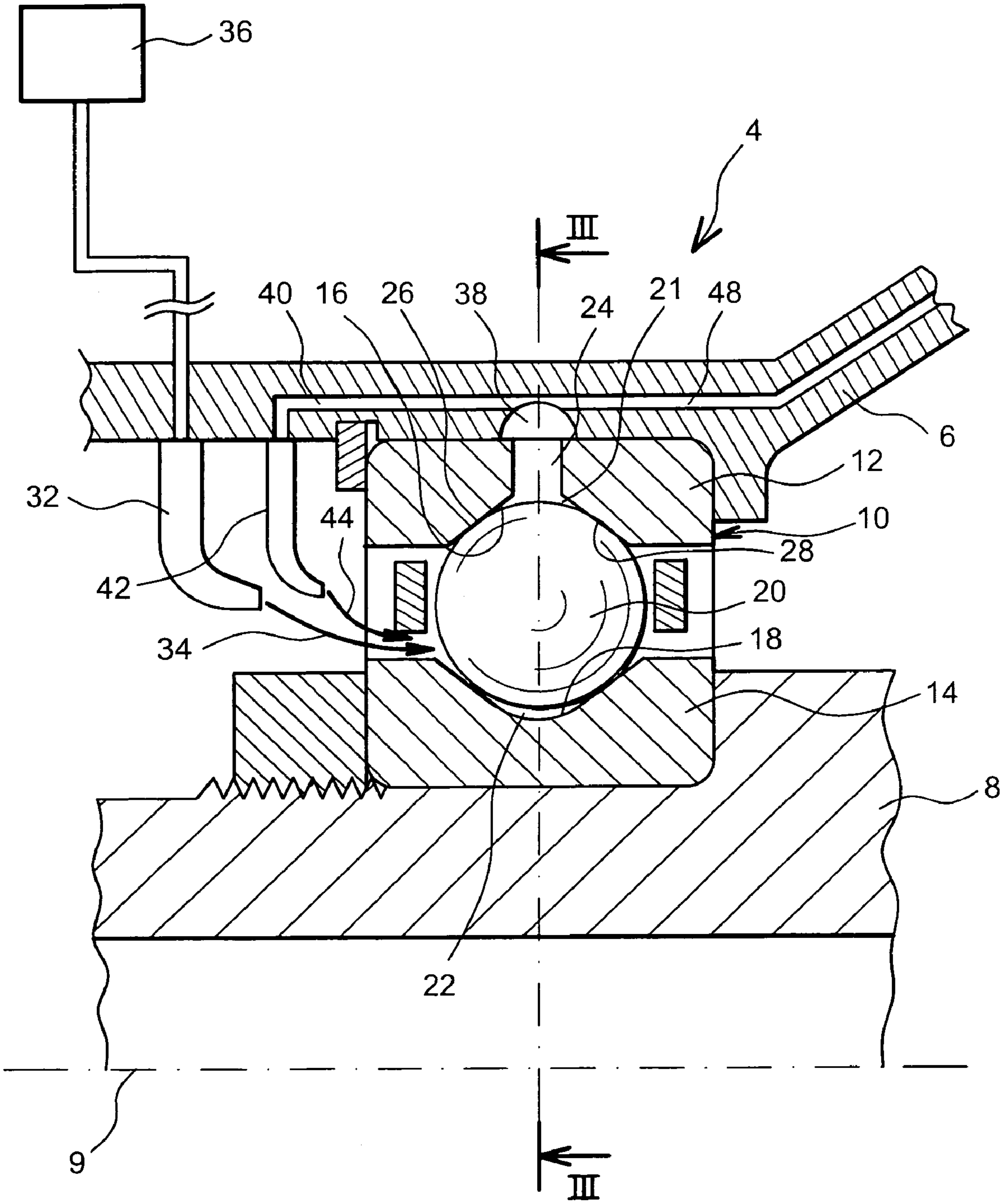
FIG. 2 shows an enlarged longitudinal sectional view of the bearing assembly in FIG. 1.
Figure 3:
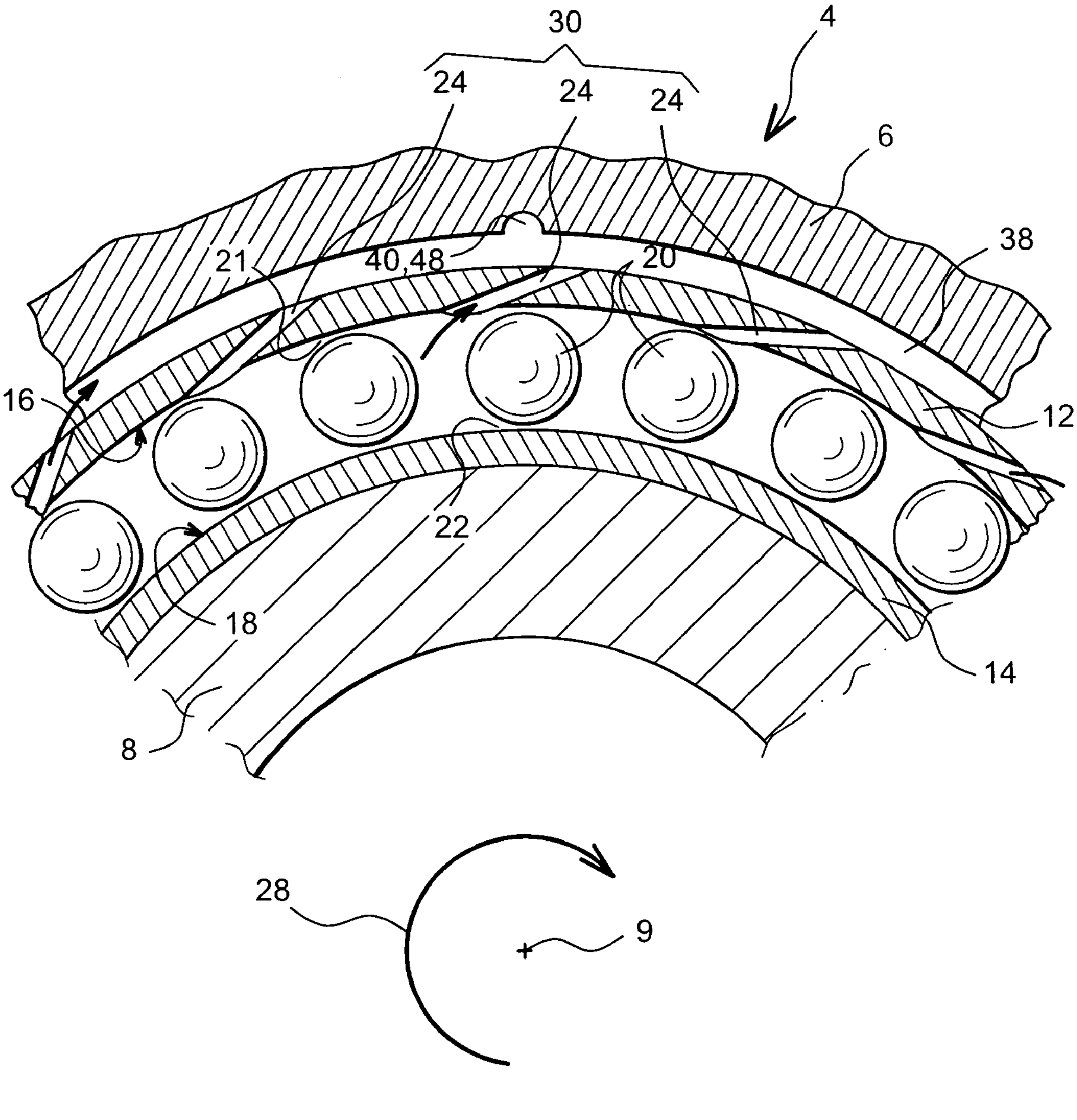
FIG. 3 shows a partial sectional view along line III-III in FIG. 2.

With reference more specifically to FIGS. 2 and 3 representing the bearing assembly 4 in detail, the figures once again show the fixed part 6 surrounding the rotating part 8 and the bearing 10 of this assembly 4 effectively inserted between these parts 6 and 8, these elements being centered on an axis 9 corresponding to the axis of rotation of the assembly.

Therefore the outside face of an outer ring 12 of the bearing 10 is in contact with the fixed part 6 mounted fixed to this outer ring 12, and the outer face of an inner ring 14 of the bearing 10 is in contact with the rotating part 8 mounted fixed onto this inner ring 14.

The opposite faces of these rings 12, 14, namely the inner faces facing each other, are bearing tracks 16 and 18 inside which balls 20 are retained. The tracks 16, 18 are not toroidal in shape, but rather in the shape of an ogive with a vertex 21 or 22 belonging to a central circumference inside which drain orifices 24 have been formed completely passing through this ring 12, for the track 16 of the outer ring 12 fixed to the fixed part 6. Therefore the balls 20 never cover these orifices 24 but touch the inner ring 14 at two lateral contact points (not referenced), and the outer ring 12 at two other lateral contact points 26 and 28 on each side of the orifices 24. In this respect, it should be noted that the tracks 16, 18 could be toroidal in shape without going outside the scope of the invention,.even if this is not the case in this first preferred embodiment.

To facilitate the liquid lubricant flow, the orifices 24 of the outer ring 12 are inclined in a rotation direction 28 of the rotating part 8 with respect to the fixed part 6, as will be described below. Furthermore, as can be seen in FIG. 3, these drain orifices 24 are uniformly distributed around the inner ring 12, and thus form a circumferential group 30 around a circumference (not shown) perpendicular to the axis 9.

Furthermore, the assembly 4 is designed so as to comprise a first liquid lubricant injector 32, this injector 32 being fixed to the fixed part 6 and oriented so as to spray liquid between the two rings 12, 14. For example, the orientation may be adapted such that the liquid lubricant output from the first injector 32 strikes a lower part of the balls 20 performing the function of bearing elements, as shown diagrammatically by the arrow 34.

This first injector 32 is designed to be fed with liquid exclusively by a non-recycled liquid lubricant source 36, which in this preferred embodiment corresponds to the fuel tank on missile 1. Thus, it should be understood that the first injector 32 ejects only liquid lubricant that has not yet passed through the bearing 10, this liquid being called <<drawn off liquid lubricant>> in the remainder of this description.

It should be noted that the connection between the first injector 32 and the reservoir 36 is preferably made in a manner known to a person skilled in the art, and may be identical or similar to means used in lost lubrication solutions according to prior art, namely for example by the use of a main fuel pump (high pressure), by the use of a booster pump (electric pump immersed in the tank) or by pressurization of the tank eliminating the need for a supercharging pump. Consequently, this connection will not be described in more detail.

Moreover, the bearing assembly 4 includes a second liquid lubricant path comprising drain orifices 24 through which the liquid lubricant escapes from the bearing 10.

More precisely, there is a groove 38 at the internal surface of the fixed part 6, this internal surface being the surface in contact with the external surface of the outer ring 12. The groove 38 then forms an annular space around this outer ring 12, and in which each of the drain orifices 24 of the group 30 opens up. In this way, it can be understood that the groove 38 can be considered as a means of collecting drained liquid lubricant outlet from the orifices 24.

The liquid lubricant located inside the bearing 10 is automatically drained and flushed out by the very high centrifugal force produced by rotation of the rotor shaft 8 towards these inclined drain orifices 24, without it being necessary to provide large and expensive means such as a pump. In this respect, it should be noted that this drain technology based on centrifugal force is also described in document FR-A-2 740 187, that is incorporated herein by reference.

In the assembly according to the invention, the liquid lubricant entering between the two rings 12, 14 then passes around the balls 20 by passing between them and at the sides of them, and fairly quickly reaches the orifices 24, therefore before automatically penetrating into the surrounding groove 38 and following the lubricant path that will now be described and that forms one of the special features of the invention.

Firstly, a reinjection circuit preferably in the form of a duct 40 formed in the fixed part 6 communicates at one of its ends with the groove 38, and at the other of its ends with a second injector 42. Consequently, the drained liquid lubricant entering the groove 38 is automatically forced to follow the above-mentioned duct 40, and then automatically penetrates inside the second injector 42 from which it is eventually injected/atomised between the two rings 12, 14. In another example, the orientation may be adapted such that the drained liquid lubricant outlet from the second injector 42 strikes a lower part of the balls 20 acting as bearing elements, as shown diagrammatically by the arrow 44. Furthermore, as can be seen in FIG. 2, the two injectors 32, 42 fixed to the fixed part 6 are preferably located adjacent to each other, but obviously could be offset circumferentially without going outside the scope of the invention.

Thus, it should be understood that this reinjection circuit 40 inserted between the groove 38 and the second injector 42 does not have any drained liquid lubricant pumping means, which makes it compact and easy to manufacture.

There is also a bypass circuit preferably in the form of a duct 48 formed in the fixed part 6 that opens up at one of its ends into the groove 38, this duct 48 being designed to evacuate surplus liquid lubricant drained outside the assembly 4, through its other end (not shown). As can be seen in FIG. 2, the ducts 40 and 48 are preferably located in line with each other, and each is substantially parallel to the axis 9 such that they can be considered like a single duct communicating with the groove 38.

Thus, when the maximum liquid flow is reached in the second injector 42, this maximum flow being controlled by the cross-section of its outlet orifice, the part of the drained liquid lubricant located in the groove 38 and unable to pass through this injector 42 is then automatically routed to the duct 48 and escapes outside the assembly 4 through this duct, still without the need for any pumping means.

In this respect, this drained and evacuated part of the liquid lubricant can possibly join the part of the drawn off liquid lubricant that was injected into the bearing 10, and that did not drain through the orifices 24 provided for this purpose. In fact, it should be noted that not all of the liquid lubricant drawn off from the tank 36 and injected into the bearing 10 follows the second liquid path, since some of this drawn off liquid is lost during its passage in the bearing 10 and automatically extracted from the assembly 4, for example by gravity.

Therefore in accordance with the above, the ball type bearing elements 20 in the bearing assembly 4 will be lubricated simultaneously and continuously with liquid lubricant drawn off from the tank 36 and sprayed through the first injector 32, and with drained liquid lubricant outlet from the orifices 24 and distributed in limited quantities by the second injector 42.

Figure 4:
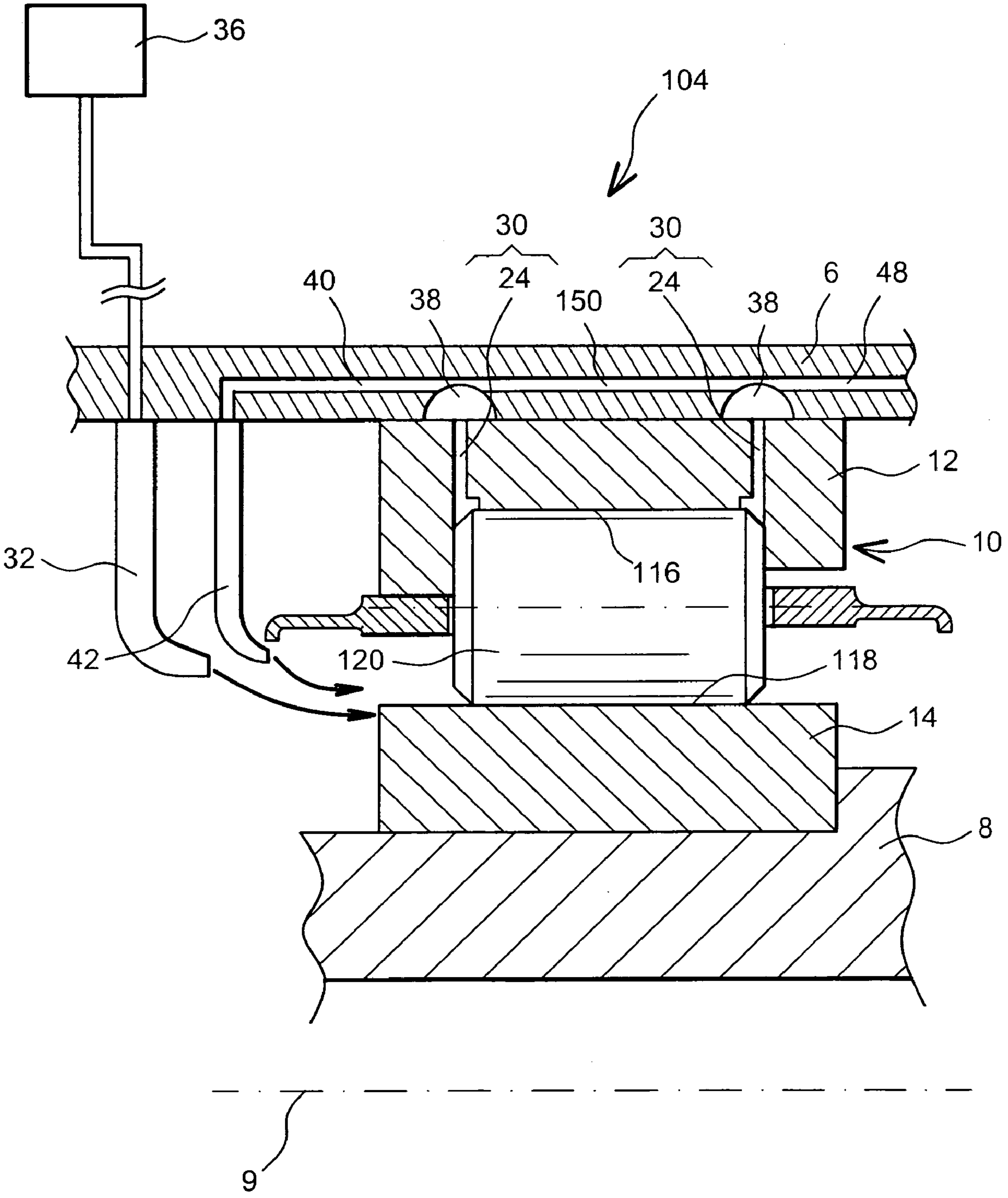
FIG. 4 shows a longitudinal sectional view of a second preferred embodiment of the bearing assembly according to this invention.

Now with reference to FIG. 4, the figure shows a bearing assembly 4 according to a second preferred embodiment of this invention, this second mode operating in a similar manner to that described above, particularly in that it does not require any pumping means to force the liquid lubricant along the second path.

Elements on this FIG. 4 with the same numeric references as those on the elements in FIGS. 1 to 3 correspond to identical or similar elements.

Thus, note a first difference from the first embodiment described above in the use of a bearing 10 with rollers 120 instead of balls 20. Thus, the outer ring 12 and the inner ring 14 are provided with toroidal tracks 116, 118 respectively, facing each other and each in intimate linear contact parallel to the axis 9, with each of the rollers 120.

The liquid lubricant distributed from the injectors 32 and 42 firstly matches the sides of the rollers 120 before reaching the cylindrical surface of these rollers with a circular cross-section, and therefore spreading along the toroidal tracks 116, 118. Part of this liquid is then drained through the drain orifices 24 in the same way as described above, in other words due to the centrifugal force related to rotation of the rotor shaft 8, without requiring any pumping means.

It should be noted also that these drain orifices 24 provided on the outer ring 12 that are also preferably inclined in the direction of rotation of the rotating part 8 with respect to the fixed part 6, are distributed in two circumferential groups 30 at a spacing from each other along the axis 9. Thus, these two circumferential groups 30 each located around a different circumference (not shown) perpendicular to the axis 9, are surrounded by two grooves 38 identical or similar to those in groove 38 in the first embodiment.

Consequently, the two (or possibly more) grooves 38 form means of collecting drained liquid lubricant output from the drain orifices 24, and communicate with the ducts 40 and 48 used for reinjection and evacuation of surplus liquid lubricant. More precisely, it can be seen in FIG. 4 that the leftmost groove 38 communicates with the reinjection duct 40 leading to the second injector 42, while the rightmost groove 38 communicates with the evacuation duct 48 extracting surplus liquid that cannot be distributed by the second calibrated injector 42. Furthermore, the two ducts 40, 48 no longer join together at the single groove 38 as was the case in the first embodiment, but an intermediate duct 150 is formed between the two grooves 38 to make this junction. In this way, it can be understood that the three ducts 40, 48, 150 are in line with each other such that they can be considered like a single duct substantially parallel to the axis 9, and communicating with the two grooves 38.

Obviously, a person skilled in the art could make various modifications to the missile 1 and to the assemblies 4 and 104 described above simply as non-limitative examples.

The invention claimed is:

1. A bearing assembly comprising a fixed part, a rotating part and a bearing inserted between said fixed and rotating parts, said bearing comprising an inner ring and an outer ring each provided with a circulation track in contact with rolling elements of said bearing, one ring being fixed to said fixed part and the other ring to said rotating part, said assembly also comprising a first liquid lubricant injector configured to be fed exclusively with non-recycled liquid lubricant, wherein a plurality of drain orifices passes through the ring fixed to said fixed part, and wherein said assembly also comprises a second liquid lubricant injector automatically fed with liquid lubricant drained through a collection device configured to collect liquid lubricant drained from the drain orifices, said collection device communicating firstly with a reinjection circuit connected to said second injector, and with a bypass circuit designed to evacuate surplus drained liquid lubricant.

2. A bearing assembly according to claim 1, wherein said collection device defines at least one annular space formed in the fixed part, and into which the drain orifices open up.

3. A bearing assembly according to claim 2, wherein each annular space is composed of a groove.

4. A bearing assembly according to claim 3, wherein said collection device defines a plurality of grooves at an axial spacing from each other and each cooperating with a circumferential group of drain orifices.

5. A bearing assembly according to claim 1, wherein said reinjection circuit comprises a duct formed in the fixed part, and communicating firstly with said collection device, and secondly with the second injector so as to feed said second injector.

6. A bearing assembly according to claim 5, wherein said bypass circuit includes a duct formed in said fixed part and communicating with said collection device.

7. A bearing assembly according to claim 6, wherein said bypass circuit duct is located in line with said duct of the reinjection circuit.

8. A bearing assembly according to claim 1, wherein the fixed part is fixed to said outer ring, and wherein the rotating part is fixed to said inner ring.

9. A bearing assembly according to claim 1, wherein said first and second injectors are fixed to said fixed part, and oriented so as to eject liquid lubricant between the inner and outer rings.

10. A bearing assembly according to claim 1, wherein said rolling elements are balls.

11. A bearing assembly according to claim 1, wherein said rolling elements are rollers.

12. A bearing assembly according to claim 1, wherein the drain orifices provided on the outer ring are inclined in the direction of rotation of the rotating part with respect to the fixed part.

13. An aeronautical vehicle equipped with a turbo-shaft engine for its propulsion, comprising at least one bearing assembly according to claim 1, said rotating part being composed of a rotor shaft of said turbo-shaft engine, and said first injector being fed exclusively with liquid lubricant from a fuel tank on said aeronautical vehicle.

14. An aeronautical vehicle according to claim 13, wherein said aeronautical vehicle includes a missile or a launch system.

* * * * *